United States Patent [19]

Masuzaki et al.

[11] Patent Number: 4,692,944
[45] Date of Patent: Sep. 8, 1987

[54] IMAGE DATA PROCESSING SYSTEM

[75] Inventors: Hidefumi Masuzaki, Odawara; Etsuo Horikawa, Minami-ashigara, both of Japan

[73] Assignee: Hitachi, Ltd., Tokyo, Japan

[21] Appl. No.: 687,158

[22] Filed: Dec. 28, 1984

[30] Foreign Application Priority Data

Dec. 28, 1983 [JP] Japan ................................. 58-245487

[51] Int. Cl.⁴ ............................................ G06K 9/00
[52] U.S. Cl. ...................................................... 382/41
[58] Field of Search ....................... 382/41, 45, 46, 47

[56] References Cited

U.S. PATENT DOCUMENTS

| | | | |
|---|---|---|---|
| 3,973,243 | 8/1976 | Whiteside et al. | 364/200 |
| 4,363,104 | 12/1982 | Nussmeier | 382/41 |
| 4,434,502 | 2/1984 | Arakawa et al. | 382/41 |
| 4,484,346 | 11/1984 | Sternberg et al. | 382/41 |
| 4,545,068 | 10/1985 | Tabata et al. | 382/41 |

*Primary Examiner*—Stewart J. Levy
*Attorney, Agent, or Firm*—Antonelli, Terry & Wands

[57] ABSTRACT

An image data processor comprises a memory for storing image data, an image data processing unit for processing the image data stored in the memory, and an address calculation unit operating in parallel with the image data processing unit for calculating the addresses of the image data and controlling input/output to and from the image data processing unit. The image data processor can execute processings of image data such as extraction, deletion, synthesization or the like of the image data at a high speed.

19 Claims, 6 Drawing Figures

| OPERATIONS OF ALU 23 | IMAGE PROCESSINGS |
|---|---|
| A ⟶ C | SIMPLE IMAGE TRANSFER |
| $\bar{B}$ ⟶ C | INVERSION OF DESTINATION IMAGE DATA |
| A or B ⟶ C | ORING OF IMAGE DATA |
| A exor B ⟶ C | EXCLUSIVE-ORING OF IMAGE DATA |
| $\bar{A}$ and B ⟶ C | INVERT, ANDING OF IMAGE DATA |
| "1" ⟶ C | IMAGE DATA IN BLACK |
| "0" ⟶ C | IMAGE DATA IN WHITE |
| B ⟶ C | SAVING OF DESTINATIONS, CURRENT DATA AT BOTH ENDS OF IMAGE |

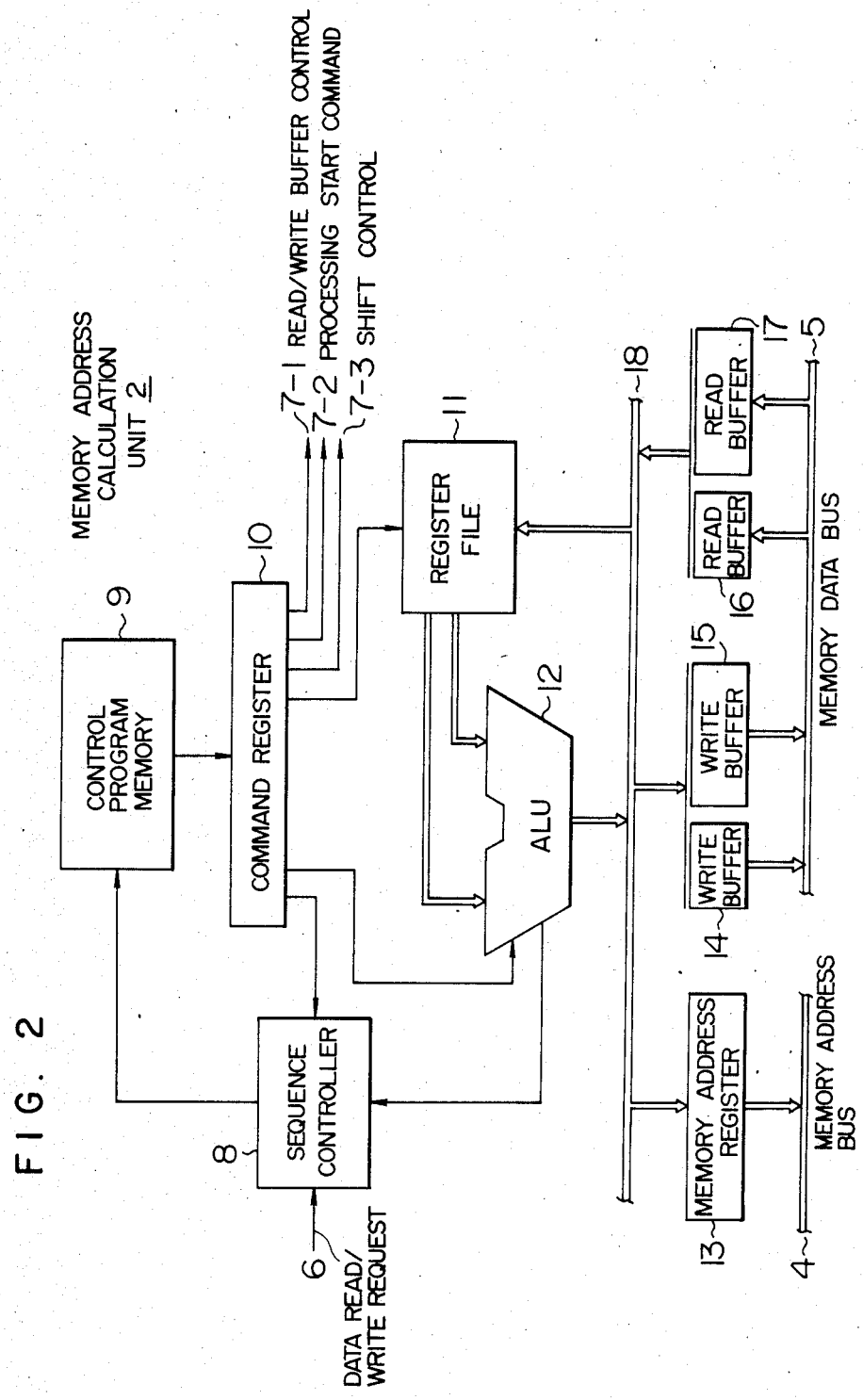

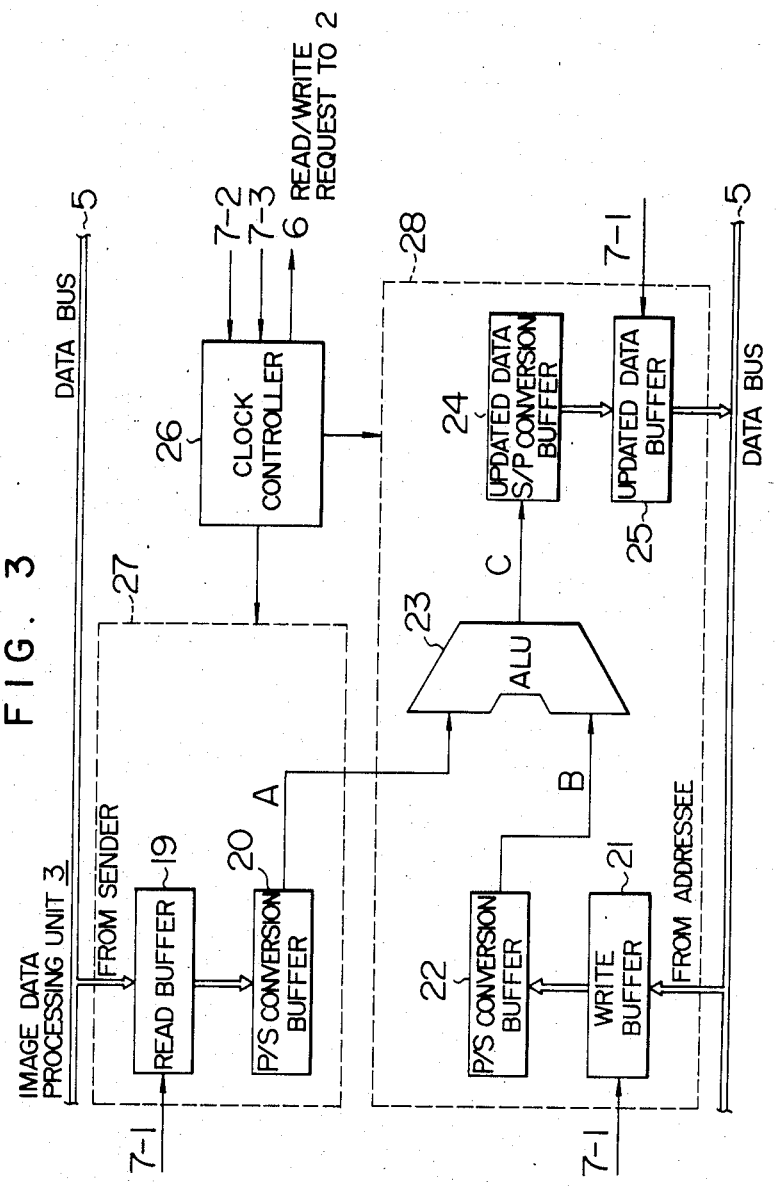

IMAGE DATA PROCESSING SYSTEM

BACKGROUND OF THE INVENTION

1. Field of the Invention

The present invention relates to an image data processing apparatus or system for executing processings of image data such as extraction, deletion, synthesization or the like types of processing. The image processor system of this type is useful as image or picture editing means and is applicable to character reading and, sign collating pattern recognition processing systems.

2. Description of the Prior Art

A major part of the image processing is a repetition of a series of processings mentioned below:
 (1) Calculation of address of desired image data in a memory.
 (2) Reading of one word of the desired image data or information from the memory.
 (3) Processing of one word of the image data read out from the memory.
 (4) Calculation of the memory address at which the processed image data of one word is to be stored.
 (5) Writing of the processed image data of one word.

In a known image data processing system, the series of processings mentioned above are executed by a single processing unit, as is disclosed in Japanese Patent Application Laid-Open No. 67445/1981. As a consequence, the address calculation, memory access and the processing of the image data are performed in a serial fashion, requiring considerable time for completing the whole processings. Among the series of processings mentioned above, the address calculation is mainly accomplished by arithmetic operation on a number of bit positions in parallel, while the processing of the image data is carried out by arithmetic operation on the individual bits sequentially. A great degree of difficulty has previously been encountered in implementing a processor which is capable of performing both types of the processings mentioned above effectively at a high speed.

SUMMARY OF THE INVENTION

An object of the present invention is to provide an image processing system in which the deficiencies of the prior art system are overcome and which is capable of processing the image data at a high speed with a simplified structure.

In view of the above object, it is proposed according to a general feature of the present invention that the address calculation and the image data processing as required be executed in parallel with each other by using separate processing units which are suited for performing the allocated processings, respectively.

BRIEF DESCRIPTION THE DRAWINGS

FIG. 2 is a block diagram showing a structure of an address calculation unit used in the system shown in FIG. 1.

FIG. 3 is a block diagram showing a structure of an image data processing unit used in the system shown in FIG. 1.

DESCRIPTION OF THE PREFERRED EMBODIMENTS

Figures 1, 4:
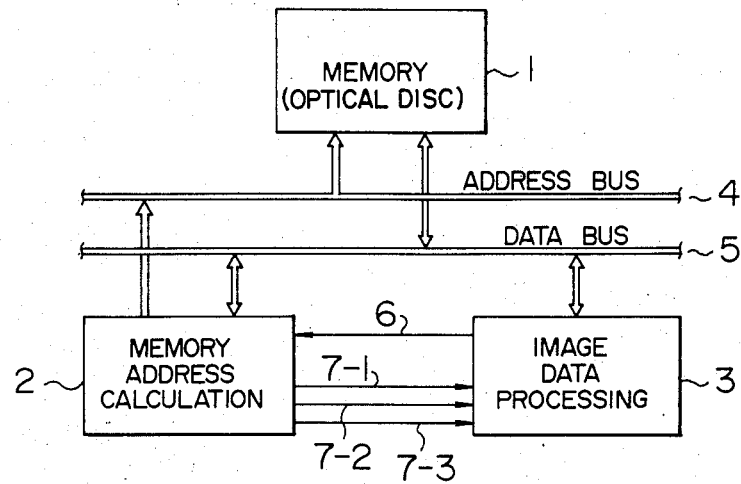
FIG. 1 is a block diagram showing a general arrangement of an image data processing system according to an embodiment of the present invention.
FIG. 4 is a view showing correspondences between operations of an arithmetic unit of the data processing unit shown in FIG. 3 and the contents of the image data processings as realized.

FIG. 1 shows schematically a general arrangement of an image data processing system according to an exemplary embodiment of the invention. Image (or picture) information or data are stored in an image data memory 1 (which may be constituted, for example, by an optical disc storage), wherein the processing of image or picture data is executed through cooperation of a memory address calculation unit 2 of a parallel processing type and an image data bit processing unit 3 of a serial type. Address data are transferred through a memory address bus 4, while image (or picture) data, instructions or commands and the like data are transferred by way of a memory data bus 5. Further, an image data read/write request signal 6, a read/write buffer control signal 7-1, a processing start command signal 7-2, a shift control parameter signal 7-3 are exchanged between the memory address calculation unit 2 and the image data bit processing unit 3. The memory address calculation unit 2 serves also for execution of memory access and management of image data processing operations as a whole in addition to the inherent calculation (or arithmetic determination) of the memory addresses. Inputting and outputting of the image data to and from the image data memory 1 may be realized by using a suitable one of the known image data input/output devices (not shown).

The image data stored in the image data memory 1 is in the form of a bit string in which each bit of "0" or "1" represents white or black information of a single picture element or pixel. In this connection, it is noted that a significantly large address space must be available as the area for storing an image of A4 in size, since capacity of about 256 kW (where one word consists of 16 bits) will then be required on the assumption that the line density is 8 lines/mm. In the case of the illustrated embodiment, it is assumed that the address space is of 16 MWord. Accordingly, the memory address bus 4 has a 24 bit width. On the other hand, the width of the memory data bus 5 is seleted to be 16 bits (i.e. 1 Word).

FIG. 2 shows in a block diagram an arrangement of the memory address calculation unit 2. As will be seen in the figure, the memory address calculation unit 2 includes a sequence controller 8, a control program memory 9, a command register 10, a register file 11 and an arithmetic and logic unit (hereinafter referred to as ALU) 12. So far as the arrangement of these components or units are concerned, the address calculation unit 2 is basically of the same structure as a conventional processor. Since the main job of the memory address calculation unit 2 is to arithmetically determine the memory addresses, the ALU 12 is of a 24-bit parallel processing type. Correspondingly, an internal data bus 18 is of 24 bits in width as in the case of the memory address bus 4.

Figure 5:
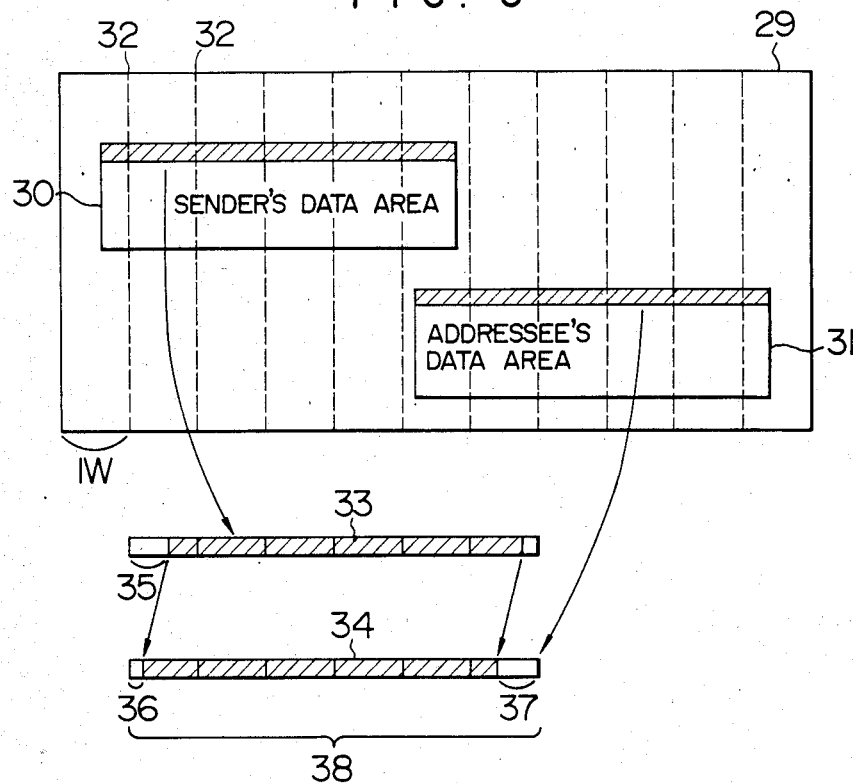
FIG. 5 is a schematic view for illustrating relationship between image regions and boundaries of a memory word.

Since data in a closed region on a picture are stored in the address space within the image data memory 1 at dispersed or discrete locations because of scanning, as will be described hereinafter in conjunction with FIG. 5, the address calculation is necessarily required for designating sequentially the address locations to the image data memory 1. The contents of the processings to be executed by the image data processing system shown in FIG. 1 are loaded in the image data memory 1 in the form of control command or instructions through a system controller (not shown). The memory address calculation unit 2 reads out the control instruction from the memory 1 and analyzes the content thereof to execute the instruction by itself and at the same time supplies the corresponding control data to the image data bit processing unit 3. The memory address calculation unit 2 makes use of a part of the image data memory 1 as a work area for the internal processing. The memory address calculated for the processing to be executed by the image data bit processing unit 3 and the memory address for the processing to be executed by the memory address calculation unit 2 itself are set onto the memory address bus 4 from the memory address register 13. A high-order section (of eight more significant bits) 14 and a low-order section (of 16 less significant bits) 15 of the data write register are constituted by buffers, respectively, which are used when the data of the memory address calculation unit 2 are loaded or written in the image data memory 1. On the other hand, a high-order section (of 8 more significant bits) 16 and a low-order section (of 16 less significant bits) 17 of the data read registers are constituted by buffers, respectively, which are used when data are fetched from the image data memory 1 by the memory address calculation unit 2.

Upon reception of the image data read/write request signal 6 from the image data bit processing unit 3, the memory address calculation unit 2 arithmetically determines the requisite address, the result of which is placed in the memory address register 13 for allowing the access to the image data memory 1. Simultaneously, the read/write buffer control signal 7-1 is sent out for allowing data transfer or exchange between the image data bit processing unit 3 and the memory data bus 5, as will be described hereinafter.

FIG. 3 shows a circuit configuration of the image data processing unit 3. Within this processing unit 3, all the image data are processed on the bit-serial basis. The image data which originates in a source of data to be transferred and constitutes one of the data to be processed (this data will be referred to as the source image data) is inputted through a source image data read buffer 19 and a source image data parallel serial (P/S) conversion buffer 20, while the current image data of a destination to which the processed data is to be transferred which constitutes the other of data to be processed (this data will be referred to as the destination image data) is inputted by way of an current destination data read buffer 21 and a current destination data parallel/serial (P/S) conversion buffer 22. The single-bit arithmetic unit (ALU) 23 performs the arithmetic operation on these two input data on the bit-serial basis with the result of the arithmetic operation being outputted as updated destination image data to be transferred to the addresses or destination through a destination update image data serial/parallel (S/P) conversion buffer 24 and an updated destination image data write buffer 25. When representing the source image data input to the one-bit ALU by A, the current destination image data input by B, and the updated destination image data output signal by C, the image processing functions shown in FIG. 4 can be realized in dependence on the contents of the bit-based operations performed by the one-bit ALU 23.

Pairs of the source image data read buffer 19 and the source image data parallel/serial (P/S) conversion buffer 20, the current destination image data read buffer 21 and the current designation image data parallel/serial (P/S) conversion buffer 22, and the updated destination image data serial/parallel (S/P) conversion buffer 24 and the updated destination image data write buffer 25, respectively, are each implemented in a double or duplicated buffer configuration, wherein at the time when the buffers 19 and 21 become empty or when the buffer 25 becomes full, a clock controller 26 immediately sends out the image data read/write request signal 6 to the memory address calculation unit 2. The clock controller 26 serves to supervise or manage the data transfer between the buffers 19, 21 and 25 and the associated conversion buffers 20, 22 and 24, respectively, while controlling the shift in the conversion buffers.

Figure 6:
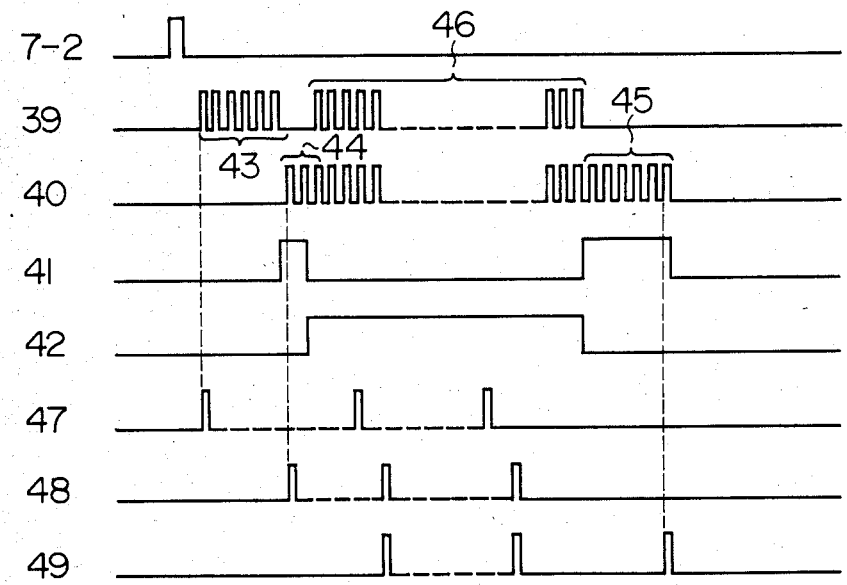
FIG. 6 is a signal timing chart for illustrating an image transfer processing.

Next, image transfer processing will be described by referring to FIGS. 5 and 6 as an example of the image processing operation. FIG. 5 for illustrates the relationship between an image data region, and word boundaries in the image data memory. Assuming that the image data located at a source image data area or region 30 is to be transferred to a destination image data region 31 in the memory space 29 for the image data to be transferred, execution for the transfer processing of a data amount of each horizontal scanning is performed. FIG. 6 shows in a timing diagram various signals which appear in the image data bit processing unit 3 when the source image data 33 corresponding to a single scan are transferred to the destination location 34 for the single scan image data.

Upon execution of the processing for transferring the image data corresponding to the single scan, the memory address calculation unit 2 supplies the shift control parameters 7-3 to the clock controller 26 of the image data bit processing unit 3, which parameters includes a source scan left-end dummy bit number 35, a destination scan left-end dummy bit member 36, a destination scan right-end dummy bit number 37 and a destination scanned word number 38. Since the memory access takes place on the word basis notwithstanding the fact that the boundary of the image data region in the memory space does not necessarily coincide with the word boundary 32 of the memory, as is illustrated in FIG. 5, saving of processing is required for the dummy portions (i.e. those portions of the accessed word which do not belong to the region in which the image data to be processed are present) located at the left and right ends, respectively, of each scan, in contrast to the other portions.

At the same time, the memory address calculation unit 2 calculates the address of the leftmost word of the source one-scan image 33 and that of the leftmost word of the destination one-scan image 34 to allow the execution of memory access, while sending out the read/write buffer control signal 7-1 for causing the data on the memory data bus 5 to be set in the source image data write buffer 19 and the current destination image data read buffer 21. Subsequently, upon reception of the processing start signal 7-2, the content of the source image data read buffer 19 is transferred to the source image data parallel/serial conversion buffer 20, whereupon a shift clock 39 (FIG. 6) for the source image data is produced. Upon completion of the shift 43 of the source scan left-end dummy portion 35, the shift clock 39 for the source image data is stopped, whereupon the content of the current destination image data read buffer 21 is transferred to the current destination image data parallel/serial conversion buffer 22, and the shift clock 40 for the destination image data is simultaneously produced.

During the shift 44 of the destination scan leftend dummy portion 36, a current destination image select signal 41 is turned on, whereupon the single-bit ALU 23 performs the bit-based arithmetic operation B→C shown in FIG. 4 (i.e. saving of the current destination image data at the right and left ends of the image). At a time point when the shift 44 of the destination scan left-end dummy portion has been completed, the source image data block 27 and the destination image data block 28 shown in FIG. 3 coincide with each other in the bit phase. In other words, both data blocks have reached the starting point of the actual image scan. Then, a valid transfer data shift 46 is effected, whereby the source image data shift clock 39 is again produced. At the same time, the source image data select signal 42 is turned on, in response to which the single-bit ALU 23 executes the bit-based operation A-C (i.e simple image transfer). Upon completion of the valid transfer data shift 46, the shift 45 of the destination scan right-end dummy portion takes place. At that time, the source image data shift clock 39 is interrupted, resulting in that the current destination image data select signal 41 is again turned on. The shift 45 of the destination scan right-end dummy portion is carried out up to the end of the associated word, whereupon the transfer processing corresponding one scan of data comes to an end.

In the course of operations described above, the states of the individual shifts 43 to 46 are supervised by the clock controller 26. The timing for exchanging these states from one to another is determined in dependence of the word number 38 and the dummy bit numbers 35, 36 and 37 included in the shift control parameter 7-3. In this manner, the source image data read request 47 is produced at a timing at which the content of the source image data write buffer 19 is transferred to the source image data parallel/serial conversion buffer 20, while the current destination image data read request 48 is generated at a timing at which the content of the current destination image data read buffer 21 is transferred to the current destination image data serial/parallel conversion buffer 22. However, since the current destination image data read request 48 is meaningless except for the one word located at both ends, respectively, of the scan in the case of the illustrated image transfer processing, this request 48 is neglected by the memory address calculation unit 2. On the other hand, the updated destination image data write request 49 is generated at the timing at which the content of the updated destination image data serial/parallel conversion buffer 24 is transferred to the updated destination image data write buffer 25. These requests 47, 48 and 49 are transmitted to the memory address calculation unit 2 as the image data read/write request signal 6. In response to these requests, the memory address calculation unit 2 immediately performs the address calculation, to allow the corresponding buffers to effect the read or write operation from or to the memory. By the way, then the timing for another data transfer between the buffers is issued before completion of the read or write operation mentioned above, the image data bit processing unit 3 stops the clock and waits for completion of the read or write processing.

The foregoing description has been made on the assumption that the image data is a binary signal representing white and black levels, respectively. However, it should be understood that the invention can equally be applied to the processing of multi-level tone data as well as color data. The multi-bit pixel data can also be processed by using the image data bit processing unit 3 which is then so designed as to process the image data on the bit-parallel and pixel-serial basis. Further, the illustrated image region to be processed is of a rectangular form. However, the image region of a circular or other configuration can also be handled by resorting to appropriate address calculations. Besides, processings for rotating an image for 90°, expansion and contraction of image or the like can be carried out.

As will be appreciated from the foregoing description, the memory address calculation on one hand and the memory access and the bit-based image data processing on the other hand can be performed in parallel to each other by employing devices of the types suited for these parallel processing according to the invention, whereby a high-speed image data processing apparatus can be realized in a simplified and facilitated manner.

We claim:
1. An image data processing system, comprising:
an optical disc storage memory for storing image data;
a bit-serial processing type image data processing unit for processing the image data stored in said memory; and
an address calculation unit of the bit-parallel processing type whch operates in parallel with said image data processing unit for calculating the address of the image data in said memory and controlling input/output of said image data to and from said image data processing unit.

2. An image data processing system, comprising:
a memory for storing image data having an address bus width that coincides with the bit width whereby, on the basis of which, arithmetic operation is carried out in said address calculation unit;
an image data processing unit for processing the image data stored in said memory; and
an address calculation unit which operates in parallel with said image data processing unit for calculating the address of the image data in said memory and controlling input/output of said image data to and from said image data processing unit.

3. An image data processing system according to claim 1, wherein said memory has an address bus width which coincides with the bit width whereby on the basis of which, arithmetic operation is carried out in said address calculation unit.

4. An image data processing system according to claim 1, wherein said memory has a word boundary which does not coincide with the boundary of a region of the image data stored in said memory, and reading of the image data being effected on the word basis;
said address calculation unit transferring said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

5. An image data processing system, comprising:
a memory for storing image data;
an image data processing unit for processing the image data stored in said memory;
an address calculation unit which operates in parallel with said image data processing unit for calculating the address of the image data in said memory and controlling input/output of said image data to and from said image data processing unit;
said memory has a word boundary which does not coincide with the boundary of a region of the image data stored in said memory, and reading of the image data being effected on a word basis;
said address calculation unit transferring to said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

6. An image processing system, comprising:
a memory for storing image data;
an address bus connected to said memory for transferring addresses of said memory;
a data bus connected to said memory for transferring the image data;
an image data processing unit connected to said data bus for receiving the image data stored in said memory through said data bus to perform logical operations; and
an address calculation unit connected to said address bus and said data bus and operating in parallel with said image data processing unit for calculating the address of the image data to be transferred to said image data processing unit from said memory, the calculated address being outputted onto said address bus, and said address calculation unit additionally controlling input and output of the image data to and from said image data processing unit.

7. An image data processing system according to claim 6, wherein said memory is an optical disc storage, said image data processing unit is of a bit-serial processing type, and said address calculation unit is of a bit-parallel processing type.

8. An image data processing system according to claim 7, wherein said memory has an address bus width which coincides with the bit width whereby on the basis of which, arithmetic operation is carried out in said address calculation unit.

9. An image data processing system according to claim 7, wherein said memory has a word boundary which does not coincide with the boundary of a region of the image data stored in said memory, and reading of the image data being effected on the word basis;
said address calculation unit transferring to said image data processing unit the information locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

10. An image data processing system according to claim 6, wherein said memory has an address bus width which coincides with the bit width whereby on the basis of which, arithmetic operation is carried out in said address calculation unit.

11. An image data processing system according to claim 6, wherein said memory has a word boundary which does not coincide with the boundary of a region of the image data stored in said memory, and reading of the image data being effected on the word basis;
said address calculation unit transferring to said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

12. An image data processing system for performing processings such as extraction, deletion, synthesization, and rotation of image data, comprising:
a memory for storing the image data;
an address bus for transferring addresses of said memory;
a data bus for transferring the image data from or to said memory;
an image data processing unit for performing the processing of the image data stored in said memory, said image data processing unit including a plurality of buffers for storing the image data readout from said memory through said data bus, an arithmetic unit for performing logical operations on the image data stored in said buffers, a buffer for storing the processed image data outputted from said arithmetic unit, and control means for controlling the transfer of the image data to said plurality of buffers for storing the image data readout from said memory; and
an address calculation unit operating in parallel with said image data processing unit for calculating the address of said image data in said memory and controlling input and output of the image data to and from said image data processing unit, said address calculation unit including a sequence controller for receiving image data read/write request signals transferred from said image data processing unit, a control program memory for outputting a control program in response to an output signal of said sequence controller, an arithmetic unit controlled by the control program outputted from said control program memory for calculating the address of the image data in said memory, and a memory address register for outputting the address calculated by said arithmetic unit onto said address bus.

13. An image data processing system according to claim 12, wherein said memory is an optical disc storage, said image data processing unit is of a bit-serial processing type, and said address calculation unit is of a bit-parallel processing type.

14. An image data processing system according to claim 13, wherein said memory has an address bus width which coincides with the bit width whereby on the basis of which, arithmetic operation is carried out in said address calculation unit.

15. An image data processing system according to claim 13, wherein said memory has a word boundary which does not coincide with the boundary of a region of the image data stored in said memory, and reading of the image data being effected on the word basis;
said address calculation unit transfers to said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

16. An image data processing system according to claim 12, wherein said memory has an address bus width which coincides with the bit width whereby on the basis of which, arithmetic operation is carried out in said address calculation unit.

17. An image data processing system according to claim 12, wherein said memory has a word boundary which does not coincide with the boundary of a region of the image data stored in said memory, and reading of the image data being effected on the word basis;
said address calculation unit transferring to said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

18. An image data processing system for performing processings such as extraction, deletion, synthesization, and rotation of image data, comprising:
a memory for storing the image data and control data;
an address bus for transferring addresses of said memory;
a data bus for transferring the image data and the control data to or from said memory;
an image data processing unit for processing the image data stored in said memory, said image data processing unit including a plurality of buffers for storing the image data read out from said memory, a parallel-to-serial conversion buffer for converting the image data stored in said plural buffers into serial bit data, an arithmetic unit for performing logical operations on the serial bit data outputted from said parallel-to-serial conversion buffer, a serial-to-parallel conversion buffer for converting the data outputted from said arithmetic unit into parallel bit data, a buffer for storing the output data of said serial-to-parallel conversion buffer, and control means for controlling the image data transfer to said plurality of buffers for storing the image data read out from said memory and outputting image data read/write requests to said memory; and
an address calculation unit operating in parallel with the image data processing unit for calculating the address of the image data in said memory and controlling input and output of the image data to and from said image data processing unit, said address calculation unit including a sequence controller for receiving the image data read/write request signals from said image data processing unit, a control program memory for outputting a control program in response to the output of said sequence controller, an arithmetic unit controlled by said control program outputted from said control program memory to calculate the address of the image data in said memory, an address register for outputting the address calculated by said arithmetic unit onto said address bus, a register for storing the control data read out from said control program memory, a register file for receiving the control data stored in said register for storing the control data and supplying said control data to said arithmetic unit, and a register for storing the control data outputted from said arithmetic unit.

19. An image data processing sytem according to claim 18, wherein said memory for storing the image data has a word boundary which does not coincide with the boundary of a region of the image data stored in said memory for storing the image data, and reading of the image data being effected on the word basis;
said address calculation unit transferring to said image data processing unit the information of locations of the image data to be processed in said image data region; and
wherein said image data processing unit performs arithmetic operation on a plurality of the image data to be processed in said image data region on the basis of said information of the locations of the image data to be processed in said image data region, and said information being supplied from said address calculation unit.

* * * * *